Jan. 20, 1925.
N. H. ANDERSON
SCALE BEAM BEARING
Filed March 24, 1922     2 Sheets-Sheet 2
1,523,504
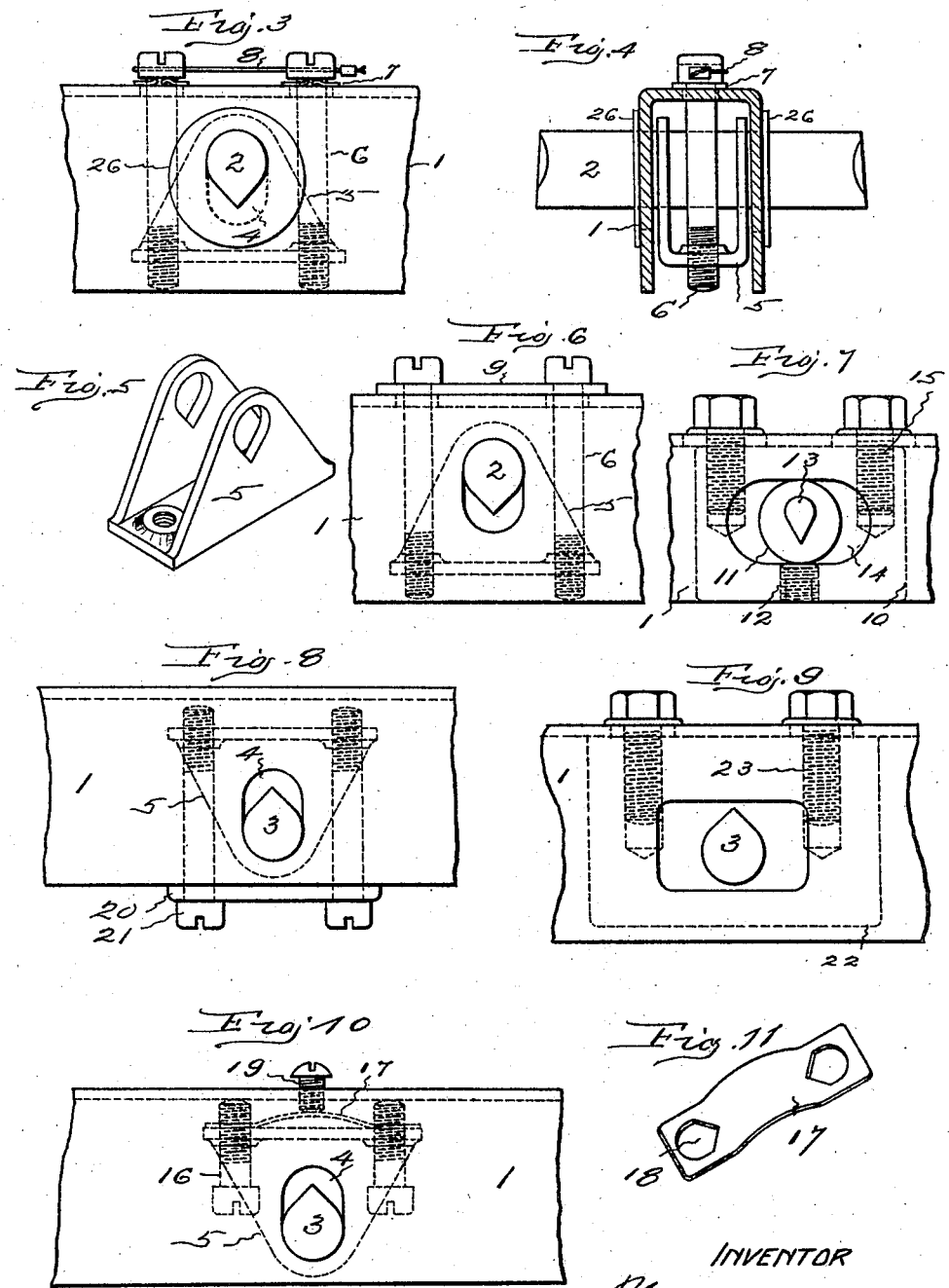

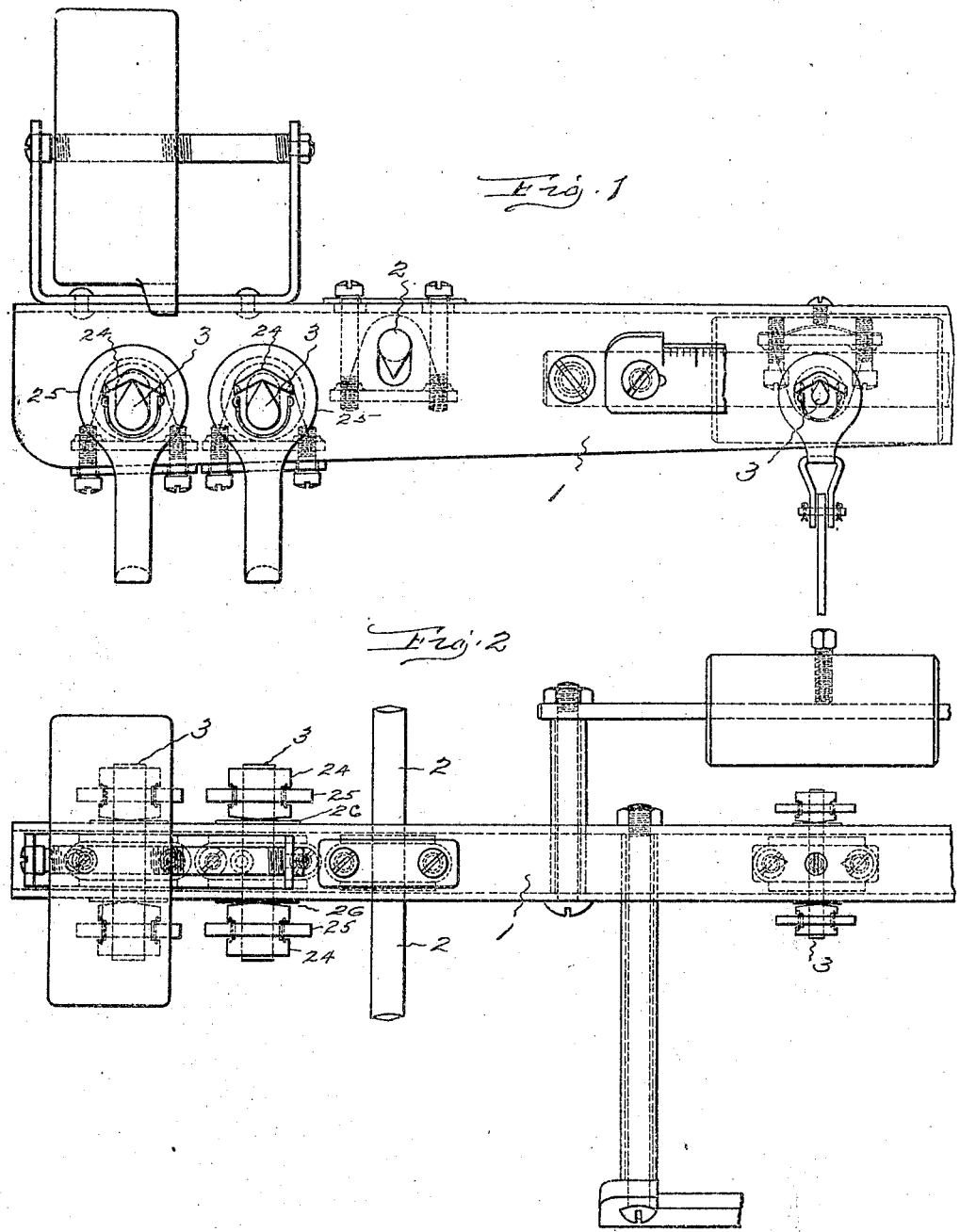

Patented Jan. 20, 1925.

1,523,504

UNITED STATES PATENT OFFICE.

NILS H. ANDERSON, OF TRUMBULL, CONNECTICUT, ASSIGNOR TO THE E. & T. FAIRBANKS & COMPANY, OF ST. JOHNSBURY, VERMONT, A CORPORATION OF VERMONT.

SCALE-BEAM BEARING.

Application filed March 24, 1922. Serial No. 546,250.

*To all whom it may concern:*

Be it known that I, NILS H. ANDERSON, a citizen of the United States, residing at Trumbull, in the county of Fairfield and State of Connecticut, have invented a new and useful Improvement in Scale-Beam Bearings, of which the following is a specification.

This invention relates to means employed for securing bearing pivots in scale beams. The accuracy of scales depends upon their bearings. The general practice is to form beams of cast or rolled bars of steel and drive slightly tapered pivots into holes made in the bars. In production manufacture variations are bound to occur in both the beams and the pivots. Frequently the beams are staked to hold the pivots in place. This is a crude method of correcting errors owing to the fact that staking is uncertain and offers very little surface support to the pivots. Another objection is due to the fact that when the pivots are fitted into the beams and it becomes necessary to renew a pivot it requires considerable labor and great skill to properly fit and accurately set the renewal. By the prior methods the pivots and the beams cannot be commercially made so accurate as to make the pivots interchangeable.

The object of the present invention is to so construct scale beams and the pivots therefor that it is possible to readily remove the pivots and substitute others when renewal is necessary; a further object is to make it possible to easily insert and securely hold pivots in beams made of sheet metal; and a still further object is to so secure the pivots that where there are several pivots in a beam it will be possible to change the effective center distances of the pivots.

This object is attained by providing an accurately adjustable and readily removable means for securely clamping the pivots in openings in the beams. The pivots illustrated and described have knife edge bearings, some arranged with the sharp edge up and others with the sharp edge down. The particular shape of the pivots shown and their exact positions with relation to the scale beam are not essential to the invention, the shape and positions may be changed to meet varying conditions.

In the accompanying drawings Figure 1 shows a front elevation of a part of a platform scale beam provided with several knife-edge pivot bearings secured according to this invention. Fig. 2 shows a top view of the same. Fig. 3 on larger scale shows a side elevation of a portion of a beam provided with one of the pivot bearings. Fig. 4 shows an edge view of the same. Fig. 5 is a perspective view of the clamp used for holding the knife-edge pivot. Figs. 6, 7, 8, 9 and 10 show side views of modified forms and arrangements of means for securing the pivot bearings. Fig. 11 is a view of a plate which may be used to lock the clamp holding screws from accidental displacement.

The scale beam 1 which is illustrated in the drawings is made of sheet metal in the form of a channel. This channel may have any desired cross sectional shape and the metal may be of any suitable thickness. The section of beam shown has a supporting pivot 2 with a downwardly pointed knife edge and loop pivots 3 with upwardly pointed knife edges, these pivots being secured to the beam by means embodying this invention.

Openings 4 are made through the side walls of the beam and the pivots extend through these openings. The openings are somewhat longer than the diameters of the pivots but at their ends preferably conform to the circular sections of the pivots. The enlarged openings permit the bearing edges of the pivots to be swung either to the right or left without interference by the beam. The pivots pass through openings in clamps 5 which in the preferred form are in the shape of yokes, Fig. 5. These clamp openings conform quite closely to the shapes of the pivots. In the base section of the yoke shaped clamp are threaded holes into which the screws 6 are turned. In the forms shown in Figs. 3, 4 and 6 these screws pass through elongated openings in the upper surface of the beam. When the screws are turned in they draw up the clamp and this forces the upper surface of the pivot against the rounded upper surfaces of the holes through the sides of the beam so that the pivot is clamped tightly in place. Either screw can be turned a little more than the other so as to change the angular position of the knife-edge of the pivot and by reason of the elongated holes in the top of the beam through which the screws pass the screws may accommodate themselves as the pivot is adjusted. As shown in Fig. 3 locking washers 7 may be placed under the heads of the screws to prevent any accidental turning of the screws. The heads of the screws may be perforated and a wire 8 may be passed through the perforations and sealed after the pivot has been adjusted as shown in Fig. 3. This not only tends to secure the screws but prevents any tampering with this particular and yet essential part of the scale. Where light metal is used for the beam a plate 9 may be placed under the heads of the screws to prevent distortion when the screws are turned up for adjusting and clamping the pivot, as shown in Fig. 6.

In some cases it may be desirable as shown in Fig. 7 to insert a block of metal 10 into the beam and fit a cylindrical piece 11 in this block. To hold the cylinder from turning a set screw 12 is turned into the block against the cylinder. The cylinder has an opening into which is fitted the knife-edge pivot 13, and it passes through elongated openings 14 in the side walls of the beam. The block has two threaded sockets into which are turned the clamp screws 15. The lateral adjustment of the pivot along the beam may be obtained by loosening the clamp screws and sliding the block to the desired position and then tightening the screws. When it is advisable or necessary to rotate the knife edge slightly the set screw 12 is loosened and the cylindrical piece with the knife edge is turned to set the edge of the pivot to the proper angle. The cylinder is then secured by tightening the set screw.

In all of the forms above described the knife edge of the pivot points downward similar to the supporting pivot 2 shown in Fig. 1. In cases where the pivot is to support a loop, as the loop pivots 3 shown in Fig. 1, the knife edge of the pivot is turned upward. When the pivot is to be arranged this way the clamp screws 16 that turn through the clamp may be set against the inside of the top of the beam so that the clamp when the screws are turned up will force the rounded surface of the pivot into the rounded ends of the openings in the side walls of the beam, as shown in Fig. 10.

If it is desired to prevent the clamp screws 16 from turning a flexed plate 17 having two openings 18 with V-shaped walls may be placed over the screws and a set screw 19 turned in against this plate through the top of the beam, as shown in Fig. 10. After the adjusting screws are brought to final position the set screw is turned in so as to bring force upon the plate which tends to straighten under the pressure and impinge against the screws to such an extent as to make it impossible to further turn the screws.

When the pivot is to be located knife edge up a plate 20 may be placed across the lower edges of the beam under the heads of the screws 21 for drawing down a clamp and securing the pivot as illustrated in Fig. 8. This latter method relieves the top of the beam from the pressure of the screws.

In the form shown in Fig. 9 a block 22 is arranged within the beam and the pivot 3 is securely fastened to this block. The clamp screws 23 pass through elongated openings in the top of the beam into the block so that the block with the pivot may be located and secured in the desired position.

In order to eliminate the possibility of the bearing plates 24 on the loops 25 from working into the openings in the beam through which the pivots pass and causing friction, washers 26 may be placed on the pivots outside of the beam as illustrated in Figs. 2 and 3. These washers which have openings that fit the pivots are desirably made of high carbon steel, hardened and polished. and they are large enough to cover the openings in the beam.

In all of these structures the pivots are firmly clamped in such a manner that they may be properly adjusted or may be quickly removed at any time and another substituted by simply manipulating the adjusting screws which control the position of the clamp that carries the pivot. It is easy to assemble and adjust or disassemble these structures and they permit the beams to be made of stamped sheet metal which is relatively thin and light.

The invention claimed is:—

1. The combination of a channel-shaped scale beam, a clamp located within the beam, a pivot carried by the clamp and extending through the walls of the beam, and means adapted to secure the clamp to the beam.

2. The combination of a channel-shaped scale beam, a clamp located within the beam, a pivot fixed to the clamp and extending through the walls of the beam, and means for turning the clamp and rotating the pivot.

3. The combination of a channel-shaped scale beam, a pivot extending through openings in the side walls of said beam, and means adapted to clamp the pivot to the walls of the openings in the beam, said means being adjustable, whereby the pivot may be turned on its longitudinal axis.

4. The combination of a channel-shaped scale beam, of a yoke-shaped clamp located within the beam, a pivot fitted into an opening in the clamp and extending through the walls of the beam, and screws threaded into the clamp and engaging the beam for adjustably connecting the clamp to the beam.

5. The combination with a scale beam having spaced side walls, of a rotatable pivot extending transversely through openings formed in the side walls of the beam, a clamp carrying said pivot, said clamp being located between the said pivot openings, and means connecting said clamp to the beam.

6. The combination with a scale beam of a pivot extending transversely through an opening in the beam, said opening being larger than the pivot, a clamp carrying said pivot, means adjustably connecting said clamp to the beam, and hardened washers fitting the pivot outside of the beam and covering the pivot openings therein.

7. The combination with a scale beam of a yoke-shaped clamp having perforations in its ends, a pivot extending transversely through a perforation in the beam that is larger than the diameter of the pivot, said pivot fitting the perforation in the clamp, and screws threaded into the clamp and engaging the beam for causing the clamp to force the pivot against the wall of the perforation in the beam.

NILS H. ANDERSON.